United States Patent [19]

Bartholemew, Jr.

[11] 4,162,129

[45] Jul. 24, 1979

[54] WINE AERATOR

[75] Inventor: Glen W. Bartholemew, Jr., San Antonio, Tex.

[73] Assignee: Wine Breather, Inc., San Antonio, Tex.

[21] Appl. No.: 828,536

[22] Filed: Aug. 29, 1977

[51] Int. Cl.² .................. B01F 11/00; B01F 13/02
[52] U.S. Cl. .................. 366/211; 366/237; 141/364; 215/100 R; 285/235
[58] Field of Search .......... 99/275, 277, 277.2, 99/485, 516, 341, 268; 261/81, 1; 366/197, 202, 208–210, 219, 235, 237, 239, 105, 211; 202/175, 201, 203; 137/112; 222/570; 215/100 R, 31; 141/319, 364; 285/235, 236, DIG. 12

[56] References Cited

U.S. PATENT DOCUMENTS

| 1,650,516 | 11/1927 | Hucks | 99/275 |
|---|---|---|---|
| 1,681,404 | 8/1928 | Hardman | 366/237 |
| 3,156,272 | 11/1964 | Indrunas | 285/235 |
| 3,447,556 | 6/1969 | Howeth | 137/112 |
| 3,615,150 | 10/1971 | Indrunas | 215/100 R |
| 3,788,616 | 1/1974 | Clough | 261/81 |
| 3,945,617 | 3/1976 | Callery | 366/347 |
| 3,982,723 | 9/1976 | Ford et al. | 285/236 |

Primary Examiner—Harvey C. Hornsby
Assistant Examiner—Timothy F. Simone
Attorney, Agent, or Firm—Cox, Smith, Smith, Hale & Guenther, Incorporated

[57] ABSTRACT

A wine breather apparatus for aerating wine having a motor driven oscillating coupler for connecting two wine containers to flow wine from one container to the other upon oscillating of the coupler and the containers to aerate the wine with a valve on the coupler for allowing outside air into the coupler and containers during oscillation thereof to aerate the wine.

6 Claims, 5 Drawing Figures

WINE AERATOR

BACKGROUND OF THE INVENTION

This invention relates generally to devices for pouring liquid from one container to another for aerating the liquid. More specifically, the invention is directed to a device for flowing wine back and forth between two containers to aerate the wine to improve the taste of the wine.

It is well known in the prior art that the flavor of the wine may be changed and often enhanced by the breathing or aerating thereof. It is believed that aerating softens the tannic acid taste and removes offensive sulphur odors. One common method of doing this is to decap or uncork a bottle and allow the wine to stand in the bottle for a period of time before drinking. However, it is believed that little aeration of the wine to soften the tannins is provided by merely leaving the wine in the bottle. It is also known in the prior art that a liquid may be poured between two containers to increase the aeration of the liquid and change the flavor thereof. So far as it is known, no mechanism has been used in the past to automatically perform such aerating other than the manual pouring of a liquid between two containers. Pouring of wine between two containers is generally not acceptable at a table in a restaurant since this must be done carefully to avoid any splashing and spilling of the wine. A wine is generally served in the bottle at a table in a restaurant which may make it necessary to pour it between two containers since it would generally not be practical to attempt to pour the wine back into the bottle.

A wine should generally be consumed shortly after aeration thereof since the introduction of large amounts of oxygen into the wine may increase the chances of spoilage of the wine if stored for long periods of time after significant aeration of the wine. Generally, in a restaurant the entire bottle or container of wine is consumed so that aeration generally does not present any problem. Certain low price wine may be enhanced significantly in flavor upon aeration so that they may take on a flavor similar to higher priced and higher quality wines. Accordingly, the marketability of many lower price wines may be increased by providing aeration thereof to enhance their flavor. The use of an aerating apparatus at a restaurant table may increase the sale of wine since the customer can watch his wine being aerated.

SUMMARY OF THE INVENTION

A new and improved wine breather apparatus for aerating wine by pouring wine back and forth between two containers so as to introduce oxygen into the wine. The apparatus includes an oscilating coupler, drivingly connected to a motor for oscilation thereof, with connectors on the coupler for removably connecting wine containers so as to flow the wine from one container to another. The coupler may be removably connecting wwine containers to the coupler. Oscilation of the coupler tilts the wine containers so as to flow the wine from one container to another. The coupler may be removably mounted upon a stand so that the coupler is supported for removal for cleaning. The stand is sized so that it may be placed on a table or cart in a restaurant. The coupler includes a valve for allowing outside air to be conducted into the coupler and containers while preventing splashing of the wine during pouring from one container to another. Containers are preferably in the form of a wine decanter having a connector member on the open end thereof for removable connection with the coupler.

DETAILED DESCRIPTION OF THE PREFERRED EMBODIMENTS

Figure 1:
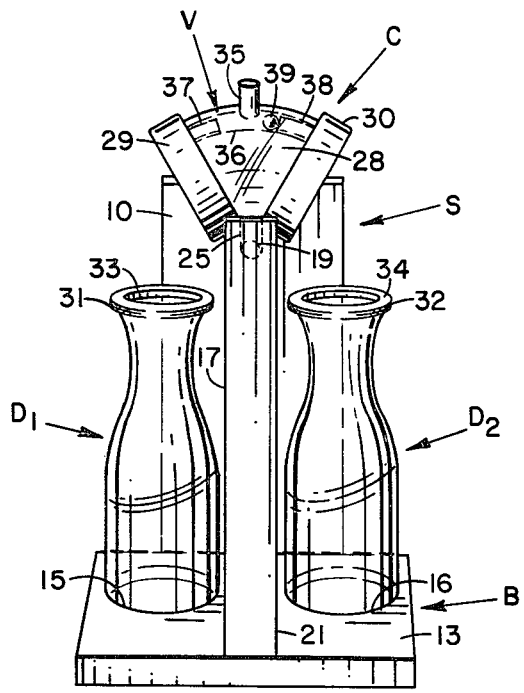
FIG. 1 is a prospective view of the wine breather apparatus showing the containers removed from the coupler.
Figure 2:
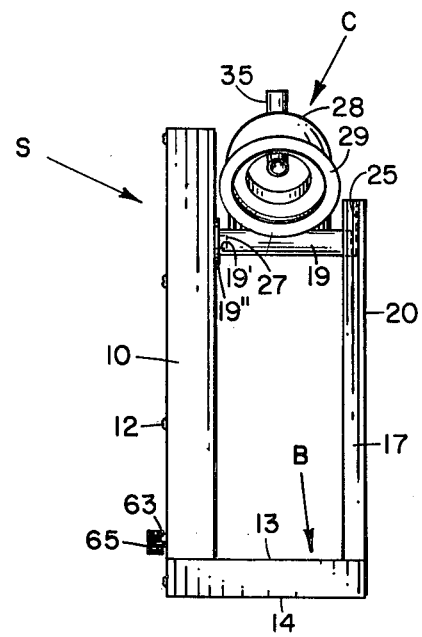
FIG. 2 is a side view of the wine breather apparatus with the containers removed from the apparatus.
Figure 3:
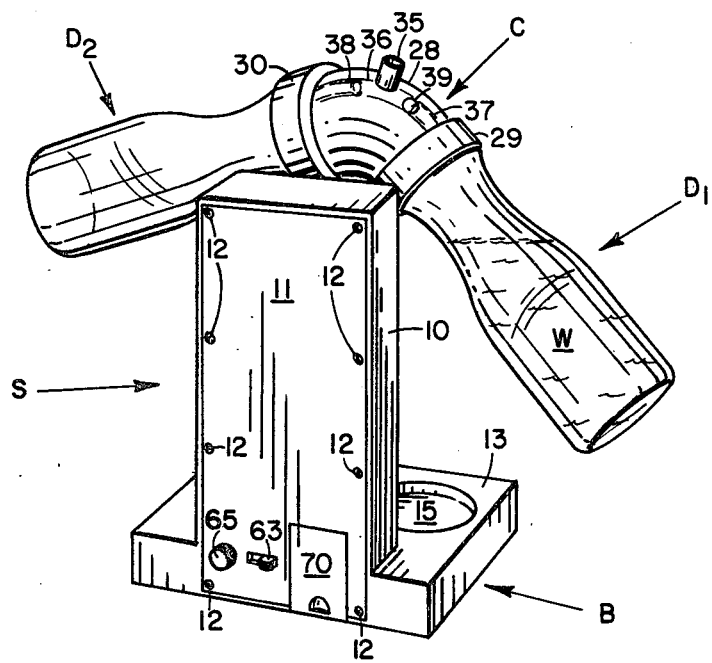
FIG. 3 is a prospective view of the wine breather apparatus showing the containers connected with the coupler.

Referring to the drawings and in particular FIG. 1, 2, and 3, there is shown an apparatus in accordance with the invention. The apparatus includes a coupler C which is mounted on a stand S for oscilation on the stand. The stand S includes a base B for setting on a table or cart or the like. The stand S houses a motor and gear drive which is operably connected to the coupler C for oscilating the coupler C to be explained more fully hereinafter. A plurality of decanters D1 and D2 are removably connectable with the coupler C for pouring a quantity of wine W from one decanter D1 as shown in FIG. 3 to the other decanter D2 so as to aerate the wine.

Figure 4:
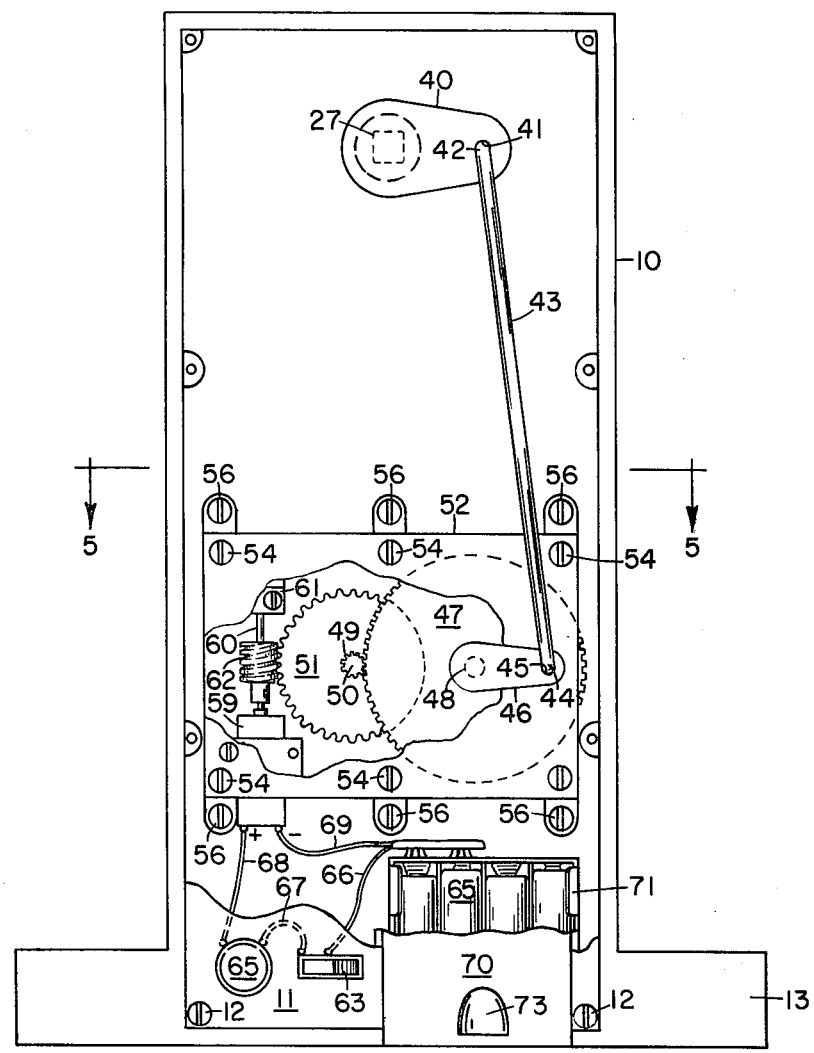
FIG. 4 is a rear view partially broken away to show the motor and drive connection for oscilating the coupler and wine containers.
Figure 5:
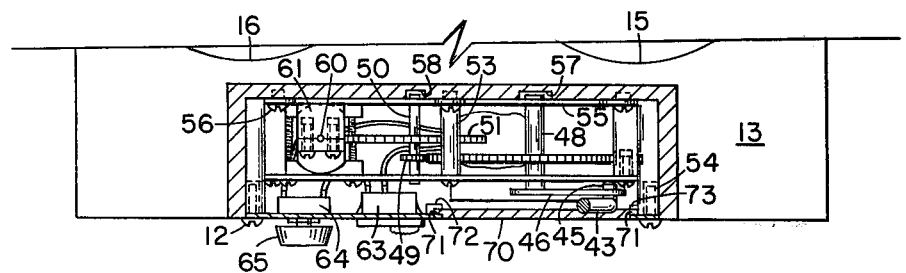
FIG. 5 is a cross-sectional view, partially broken away taken along line 5—5 in FIG. 4.

The stand S includes an outstanding column 10 which has an open back and is hollow for housing the motor means and drive means as shown in FIG. 4 and 5. The back 11 of the column 10 is secured with the hollow column by a plurality of screws for installation and servicing of the motor and drive mechanism. A base plate member 13 is rigidly connected with column 10 and is designed so that the bottom thereof 14 may be rested upon a table, cart or countertop during use. The upper service of the base includes recesses 15 and 16 which are designed to receive the decanters D1 and D2 as shown in FIG. 1 so that the decanters will not slide off the base.

Affixed to the front portion of the base 13 is an upstanding post 17. At the upper end of the post member 17 is a notched out portion 29 for receiving the cylindrical shaft 19 which shaft is described in detail hereinafter. The notched out portion 25 does not extend all the way to the front surface 20 of the post member 17 but preferably extends about two thirds of the way through the post member 17 as viewed in FIG. 2. The notched out portion 25 extends through the top of the post 17 so that the shaft 19 may be slid out of the notched out portion.

The shaft 19 includes a separate aperature 19' at one end thereof which receives a square drive shaft 27. The square drive shaft 27 also includes a suitable bushing or washer 19" affixed thereto so as to contact the other surface of the column 10. The coupler C may be removed from the stand S by lifting upward so that shaft 19 may be slipped out of the notched or cut-out portion 25 in order that the coupler C may be readily cleaned.

Rigidly secured with a shaft 19 is a cylindrical conduit 28 which is curved as best shown in FIG. 1 and is preferably made of a rear material such as acrylic or other plastic so that the wine pouring through the conduit may be viewed. Connectors 29 and 30 are at opposed ends of the conduit 28 for removably securing the decanters D1 and D2 thereto.

The connectors 29 and 30 have internal screw threads (not shown) for connection with the screw threads 31 and 32 on the decanters D1 and D2 respectively. Although conventional threads are used for connecting the decanters with the coupler it is contemplated that a bayonet type mount could also be used for quick coupling. The screw threads 31 and 32 are on rings 33 and 34 respectively. The rings 33 and 34 preferably may be permanently affixed to the decanters by adhesive or they may be adapted to be slipped upon the rim of a decanter with the tightening of the decanter in the internal screw threads of the connectors tightly retaining the rings on the decanter. Alternatively, the rim portion of each carafe may include integrally molded threads formed thereon as opposed to a separate ring having threads. It is also contemplated that other suitable connectors could be used on the conduit 28 so that conventional wine carafes could be attached to the conduit without any modification thereof.

The conduit 28 further includes a valve V including a tubular member or tubing 35 which extends through an opening in the top of the conduit 28 and is sealingly mounted with the opening. The tubular member 35 is connected to a similar tubular member or having the same inner and outer diameters as the tubular member 35. The tubular member 36 is curved with approximately the same degree of curvature as conduit 28 as best shown in FIG. 1. Additional conduit members or tubing 37 and 38 having outside diameters of approximately the same as the inside diameter of the tubular member 36 so that they may be slipped therein and secured thereto with suitable adhesive or the like. The tubular members 35, 36, 37 and 38 may be typically made from acrylic or other clear plastic which may be integrally molded or secured together with suitable adhesives or by other known methods.

A spherical ball 39 is sized so that it may be dropped through the opening in the tubular member 35 and fall into the tubular member 36 and rest against one of the seats formed by the ends of the tubular members 37 and 38. Since the tubular members 37 and 38 extend into the tubular member 36, the ball 39 may rest against one of these ends so as to form a blocking seal. The ball 39 will roll back and forth in the tubular portion 36 depending upon the orientation of the oscilating coupler C so as to alternately block one of the tubular members 37 and 38. Accordingly, as wine pours from one decanter into another it will block any splashing out of the tubular member 35 of the wine from one decanter being filled. Air will be allowed to enter through the tubular member 35 and the other tubular member 37 or 38. Since the tubular members 37 and 38 are in the upper portion of the conduit 28 no wine will flow into these members during the flow of the wine between decanters.

Referring to FIG. 4 and 5, the drive mechanism of the apparatus is shown in detail. The square shaft 27 is mounted with the column 10 and is rigidly secured with a crank 40 which oscilates 120 degrees. The crank 40 includes an aperature 41 in one end of thereof through which is inserted a bent end 42 of a rod 43. Rod 43 further includes a second bent end 44 which extends through an aperature 45 and a second crank 46. Pins (not shown) may extend through openings (not shown) in the bent ends 42 and 44 to secure the rod 43 with the cranks 40 and 46. The crank 46 is mounted for rotation with gear 47 on rotating shaft 48. The teeth of large gear 47 engage a second gear 49 which is rotatibly mounted with shaft 50 along with gear 51. A plate member 52 is secured with column 10 in spaced relation thereto by means of spacers 53 having bolts 54 extending therethrough and screws into threaded openings in the column. A second plate 55 is mounted with the column 10 adjacent to the inner face thereof and held in position with screws 56 which extend through tabs on the plate so they may be screwed into threaded openings in the column 10. A recess 57 and another recess 58 are provided for the shafts 48 and 50 respectively. The shafts 48 and 53 are rotatibly mounted in aperature in plates 52 and 55. A suitable motor 59 is secured between the plates 52 and 55 and includes a shaft 60 which extends through a bushing 61 which is mounted with a plate member 52. A worm gear 62 is mounted on the shaft 60 so as to drivingly engage gear 51.

An on-off switch 63 is mounted with the back member 11 and a control 64 is also mounted on the back member 11. The control 64 is a variable power switch. The switch knob 65 which may be rotated to vary the speed of the motor 59. A plurality of DC batteries 65 are connected in a series with their appropriate pole and connected through wires 66, 67, 68 and 69 so as to provide power to the motor 59 through the on-off switch 63 and control 64. The batteries 65 are mounted in a suitable mounting member 71 which provides the series connection. An access plate 70 is provided for removal and replacement of the battery. The access plate 70 includes a recess in the plate allowing gripping of the plate with a fingernail or the like to slide the plate 70 out of position for replacement of the batteries. Although a battery powered motor is shown, it is understood that other suitable power sources such as household current could be utilized to drive the crank 40 so as to oscilate the coupler C. Also, other suitable gearing and drive means could be utilized to oscilate the coupler C.

The operation of the wine breather apparatus is described more fully as follows. A quantity of wine may be poured into Decanter D1 and the decanter may be connected with the connector 29 on the coupler C. The other Decanter D2 is then connected to the connector 30 as shown in FIG. 3. With the batteries in place as shown in FIG. 4, the switch 63 may be turned on and the knob 65 may then be turned to provide the appropriate speed to the motor to turn control of the rate of oscilation. The gearing and motor are selected so that the shaft 48 preferably rotates at six revolutions per minute to flow the wine between the decanters D1 and D2 so as to aerate therein. Preferably, at least 10-15 oscilations are provided to fully aerate the wine. As the Decanter D2, as shown in FIG. 3, approaches the base 13 the wine in Decanter D1 will flow into Decanter D2 through the conduit 28. Gravity will cause the ball 39 to drop to engage the end of the tubular member 38 which extends into the tubular member 36. As the wine W flows through into the decanter D2 it cannot splash out of the tubular member 35 through the tubular member 38 which is blocked by the ball 39. However, air can travel through the tubular members 35, 36 and 37 to facilitate aeration of the wine. As will be apparent upon rotation of the decanter D1 toward the base 13 and ball 39 will return to its position as shown in FIG. 3 and the wine which had been poured into Decanter D2 will flow back into the Decanter D1.

The Decanters D1 and D2 may be cleaned in the usual manner since they may be made of glass or other suitable material and the coupler C may also be cleaned by removing it from the stand S. This may be accomplished by lifting the drive shaft 19 upward so it may be slipped through the notched out portion 25. Square shaft 27 merely extends into a square opening 19' in the shaft 19 so that the coupler may be slipped off of the shaft 27 and removed from the stand S for cleaning. The ball 39 may be removed through the tubular portion 35 to also facilitate cleaning. A cap may also be provided to partially block the tubular conduit 35 so that the ball 39 will not fall out and be lost.

The operation of the wine breather apparatus allows the wine to be fully aerated in a very short period of time which may be only a few minutes. Accordingly, it is not necessary to open a bottle of wine far in advance, making the apparatus ideally suited for use in restaurants or other establishments where wine is served shortly after opening. The apparatus may also increase the sale of wine since it enables the customer in a restaurant to actually view his own wine being aerated if the apparatus is placed upon the table. This is made possible through the use of DC motor and self-contained battery source since electrical outlet may not be readily available at all tables in a restaurant.

While there has been shown and described a preferred embodiment of a wine breather apparatus in accordance with the invention, it would be appreciated that many changes and modifications may be made therein without, however, departing from the essential spirit of the invention within the scope of the claims.

I claim:

1. A wine breather apparatus, comprising:
   A support stand with a coupler removably connecting two wine containers;
   said coupler including a flow path for flowing wine back and forth between two containers;
   means for oscillating the coupler to pour wine back and forth between the containers through the coupler to aerate the wine;
   the coupler including a valve for allowing air into the wine while preventing the spilling of the wine;
   said coupler being removably mounted on the support stand; and operably connected with a motor to oscillate the coupler to aerate the wine;
   the valve including an air-inlet tube communicating air from outside the coupler to within and a ball for preventing splashing of the wine out of the air-inlet tube; and
   the valve including two air-outlet tubes connected with the air-inlet tube for connecting outside air into the coupler and containers; and
   each air-outlet tube having a seat for the ball to block the air-outlet tube which extends into the container into which wine is being poured.

2. The apparatus as set forth in claim 1, wherein:
   the valve including two air-outlet tubes connected with the air-inlet tube for connecting outside air into the coupler and containers; and
   each air-outlet tube having a seat for the ball to block the air outlet tube which extends into the container into which wine is being poured.

3. The apparatus as set forth in claim 1, wherein:
   the coupler included a conduit member removably mounted on a stand for oscillation thereon; and
   connectors on opposed ends of the conduit for releasably mounting the containers.

4. The apparatus as set forth in claim 1, wherein:
   the containers including connectors at their open ends for releasably connecting with the coupler.

5. The apparatus as set forth in claim 1, wherein:
   a control is provided to vary the motor speed and amount of aeration.

6. The apparatus as set forth in claim 1, wherein:
   the support stand houses a self-contained power source for oscilating the coupler.

* * * * *